United States Patent
Tanaka et al.

(10) Patent No.: US 9,776,286 B2
(45) Date of Patent: Oct. 3, 2017

(54) METHOD OF MANUFACTURING A VEHICLE BODY AND A VEHICLE BODY

(71) Applicant: Fuji Jukogyo Kabushiki Kaisha, Tokyo (JP)

(72) Inventors: Kiichiro Tanaka, Tokyo (JP); Ikuo Watanabe, Tokyo (JP); Teruhiko Yajima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 99 days.

(21) Appl. No.: 14/329,040

(22) Filed: Jul. 11, 2014

(65) Prior Publication Data
US 2015/0034703 A1 Feb. 5, 2015

(30) Foreign Application Priority Data
Jul. 30, 2013 (JP) .................................. 2013-157900

(51) Int. Cl.
*B62D 65/02* (2006.01)
*B23K 37/04* (2006.01)
*B23K 31/02* (2006.01)
*B23K 101/00* (2006.01)

(52) U.S. Cl.
CPC .............. *B23K 37/04* (2013.01); *B23K 31/02* (2013.01); *B62D 65/026* (2013.01); *B23K 2201/006* (2013.01)

(58) Field of Classification Search
None
See application file for complete search history.

(56) References Cited

U.S. PATENT DOCUMENTS

| 4,767,046 | A | * | 8/1988 | Kumagai | ............ | B05B 13/0285 228/4.1 |
| 5,319,840 | A | * | 6/1994 | Yamamoto | ............. | B62D 65/02 29/430 |
| 5,374,799 | A | * | 12/1994 | Nishimoto | ............. | B62D 65/02 219/117.1 |
| 6,131,284 | A | * | 10/2000 | Basler | .................. | B62D 25/082 29/458 |
| 7,075,029 | B2 | * | 7/2006 | Lee | .......................... | B23K 11/11 219/117.1 |
| 9,371,100 | B2 | * | 6/2016 | Fujisaki | ............... | B62D 65/026 |

(Continued)

FOREIGN PATENT DOCUMENTS

JP 2009-154815 7/2009

*Primary Examiner* — Devang R Patel
(74) *Attorney, Agent, or Firm* — Smith, Gambrell & Russell, LLP

(57) ABSTRACT

In a method of manufacturing a vehicle body a side structure and a center structure are positioned in place using a fixture or the like, and fixed by welding with maintained accuracy of mounting positions; annular parts along the width of the cabin of the vehicle and other parts are temporarily mounted to be retained without being welded; additional welding is performed on the center structure and the side structure, and the annular parts along the width of the cabin of the vehicle and other parts are positioned in place using a fixture or the like, and are fixed by welding with maintained accuracy of mounting positions; additional welding is performed on the parts; and a roof complex is mounted and fixed by welding with maintained accuracy of mounting positions.

9 Claims, 5 Drawing Sheets

(56) References Cited

U.S. PATENT DOCUMENTS

| | | | |
|---|---|---|---|
| 2005/0057077 A1* | 3/2005 | Telehowski | B62D 23/005 296/203.03 |
| 2009/0078741 A1* | 3/2009 | Sata | B23P 21/004 228/6.1 |
| 2014/0259614 A1* | 9/2014 | Doll | B62D 65/022 29/430 |
| 2015/0103089 A1* | 4/2015 | Sogo | B60K 35/00 345/589 |

* cited by examiner

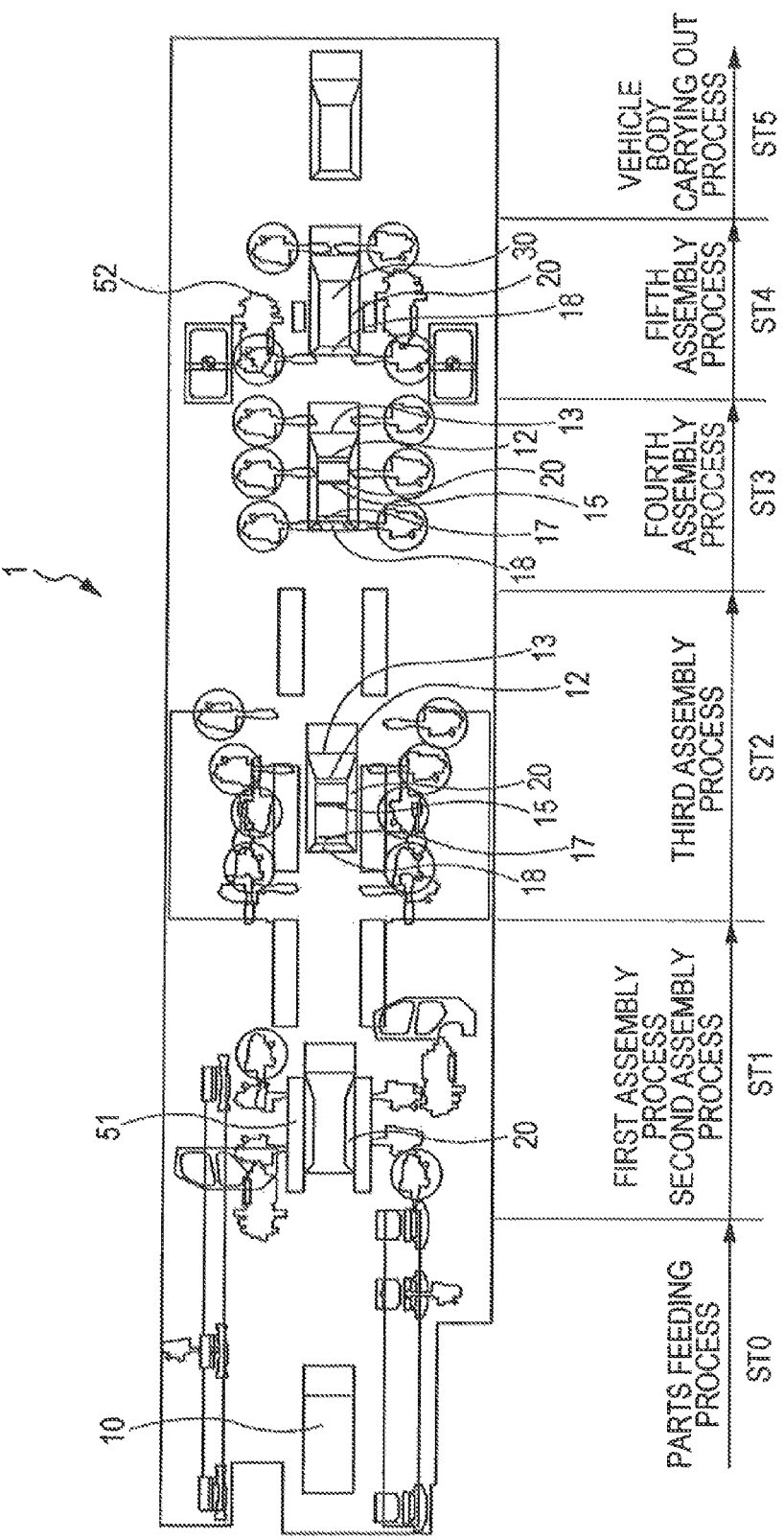

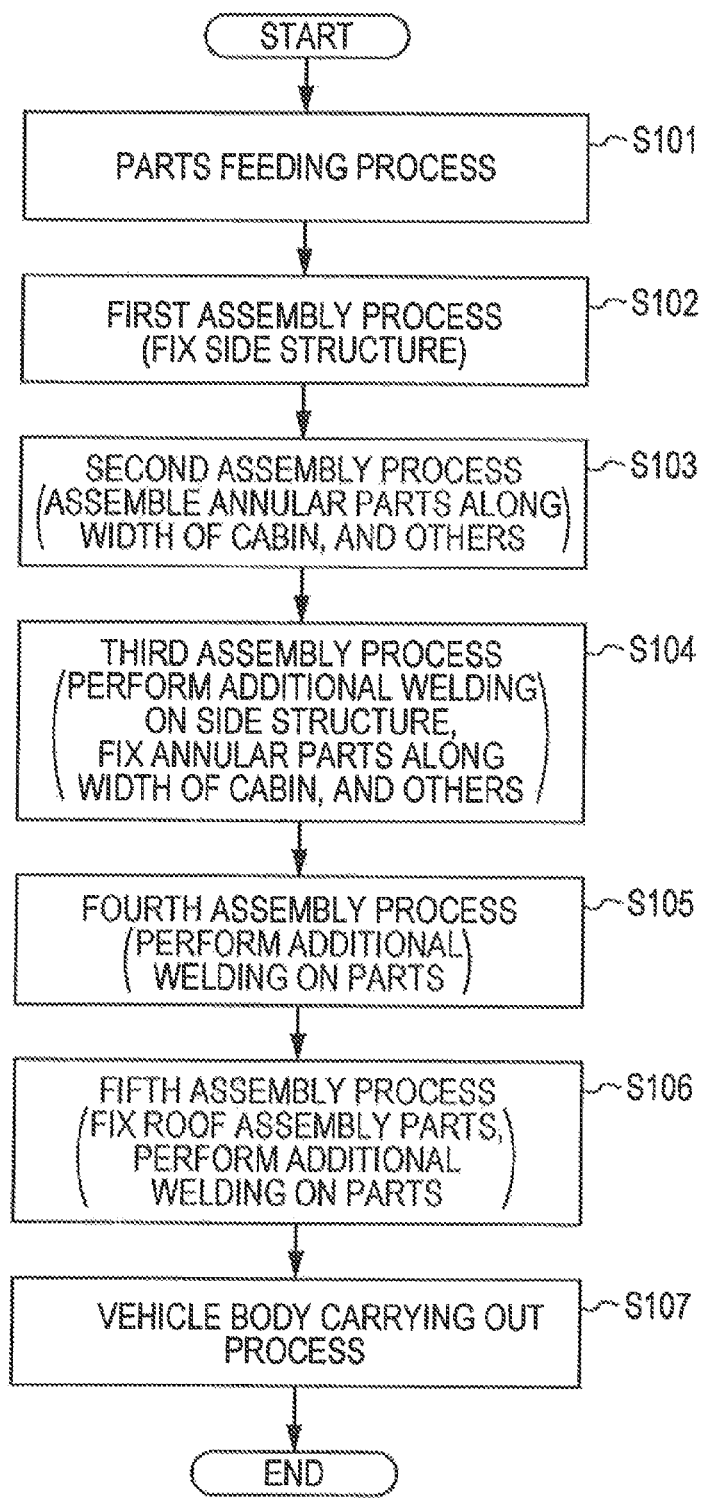

METHOD OF MANUFACTURING A VEHICLE BODY AND A VEHICLE BODY

CROSS-REFERENCE TO RELATED APPLICATIONS

The present application claims priority from Japanese Patent Application No. 2013-157900 filed on Jul. 30, 2013, the entire contents of which are hereby incorporated by reference.

BACKGROUND

1. Technical Field

The present invention relates to a method of manufacturing a vehicle body.

2. Related Art

As methods of manufacturing a vehicle body of a vehicle, various technologies have been proposed and put in practical use. For example, a vehicle body production method disclosed in Japanese Unexamined Patent Application Publication (JP-A) No. 2009-154815 includes mounting a floor member of a target vehicle type on a floor mount stage; temporarily fixing right and left inner structural parts, a roof beam to the floor member in a first temporary fixing stage; performing additional welding on the vehicle body after the temporarily fixing; temporarily fixing side outer members to the inner structural parts; performing additional welding on the vehicle body after the temporarily fixing of the side outer members; temporarily welding a roof member from above the side outer members; and performing additional welding on the vehicle body after the temporarily welding.

In the vehicle body production method disclosed in JP-A No. 2009-154815, the parts are first temporarily fixed and then temporarily welded. Accordingly, when, for example, the vehicle is transported for the temporarily welding after fixing right and left side structural parts to a lower central structural part, a problem arises in that during the transportation, a variation may occur between the mounting positions of the right and left side structural parts and the lower central structural part. Even when the vehicle body is positioned in place by a fixture used in the temporarily fixing, it may be impossible to eliminate the variation completely. This problem is particularly pronounced as the number of parts to be temporarily fixed in each process increases. In addition, when temporary fixation is attempted to be completed in one process, the operational range of welding robots is also limited and narrowed, and thus it may be difficult to perform welding at accurate welding positions while maintaining a sufficient strength of the vehicle body.

SUMMARY OF THE INVENTION

The present invention has been designed in consideration of the circumstances described above, and an object thereof is to provide a method of manufacturing a vehicle body that is capable of assuring sufficient required strength and safety by connecting the parts included in the vehicle body efficiently, accurately and easily even when the vehicle body has a large number of parts.

An aspect of the present invention provides a method of manufacturing a vehicle body, the method including: a feeding process to supply necessary parts for assembly of the vehicle body to an assembly line; a first assembly process to fix by welding right and left side structural parts to a lower central structural part of the vehicle body with maintained accuracy of mounting positions; a second assembly process to temporarily mount by retaining but not welding at least an annular part along a width of a cabin of the vehicle to the vehicle body which has been assembled in first assembly process; a third assembly process to perform additional welding on the lower central structural part and the right and left side structural parts of the vehicle body which has been assembled in the second assembly process, and to fix by welding the annular part along the width of the cabin of the vehicle with maintained accuracy of mounting positions; a fourth assembly process to perform additional welding on the parts; a fifth assembly process to fix by welding at least a roof structural part with maintained accuracy of mounting positions after either one of the third assembly process and the fourth assembly process; and carrying out the vehicle body which has been assembled in the above processes.

BRIEF DESCRIPTION OF THE DRAWINGS

FIG. 1 is a schematic explanatory diagram of each of stages of an assembly line for vehicle bodies according to an implementation of the present invention;

FIG. 2 is a flow chart illustrating a process of vehicle body assembly according to the implementation of the present invention;

FIG. 3A is a perspective view of a center structure with a side structure fixed to the center structure; and FIG. 3B is an explanatory diagram illustrating the welding spots at which the side structure is welded to the center structure;

DETAILED DESCRIPTION

Figure 3A:
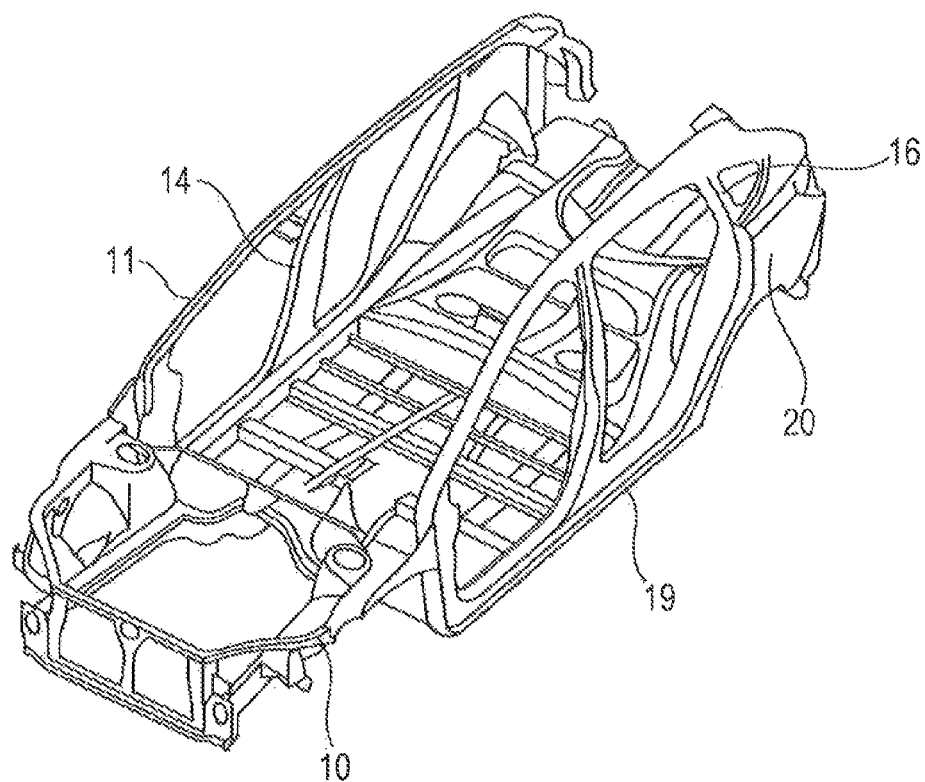
FIGS. 3A and 3B are each an explanatory diagram of a first assembly process according to the implementation of the present invention.

Hereinafter, an implementation of the present invention will be described with reference to the drawings. In FIG. 1, symbol 1 indicates an assembly line for bodies of vehicles, and the assembly line 1 includes a plurality of stages (six stages ST0 to ST5 in the present implementation). The vehicle body, which is assembled in the previous stage, is transported to the next stage by a shuttle conveyor or the like.

In the first stage ST0 of the above-mentioned stages, parts feeding process is performed in which parts necessary for assembly of the vehicle body are supplied to the assembly line. As illustrated in the figures, the parts necessary for assembly of the vehicle body refer to a front rail 12 that connects a center structure 10 and right and left front pillars 11, a duct complex 13, a brace center 15 that connects the upper ends of right and left center pillars 14, a rear rail 17 that connects the upper ends of right and left rear quarters 16, a rear skirt 18, and a rear panel (not illustrated), the center structure 10 serving as a lower central structural part of the vehicle body, the front rail 12, the duct complex 13, the brace center 15 and the rear rail 17 serving as annular parts along the width of the cabin of the vehicle. More specifically, the center structure 10 includes, for example, a front wheel apron, a toe board, a front floor, a rear floor, a rear wheel apron (none of them is illustrated), and is carried in by a shuttle conveyor or the like. In addition, each of the parts including the front rail 12, the duct complex 13, the brace center 15, the rear rail 17, the rear skirt 18, and the rear panel is carried in by a worker.

Figure 3B:
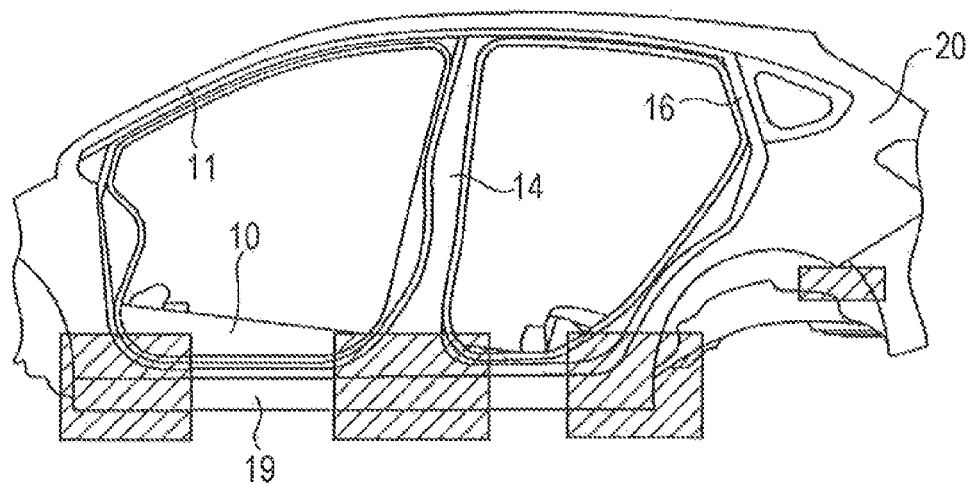
Figure 4:
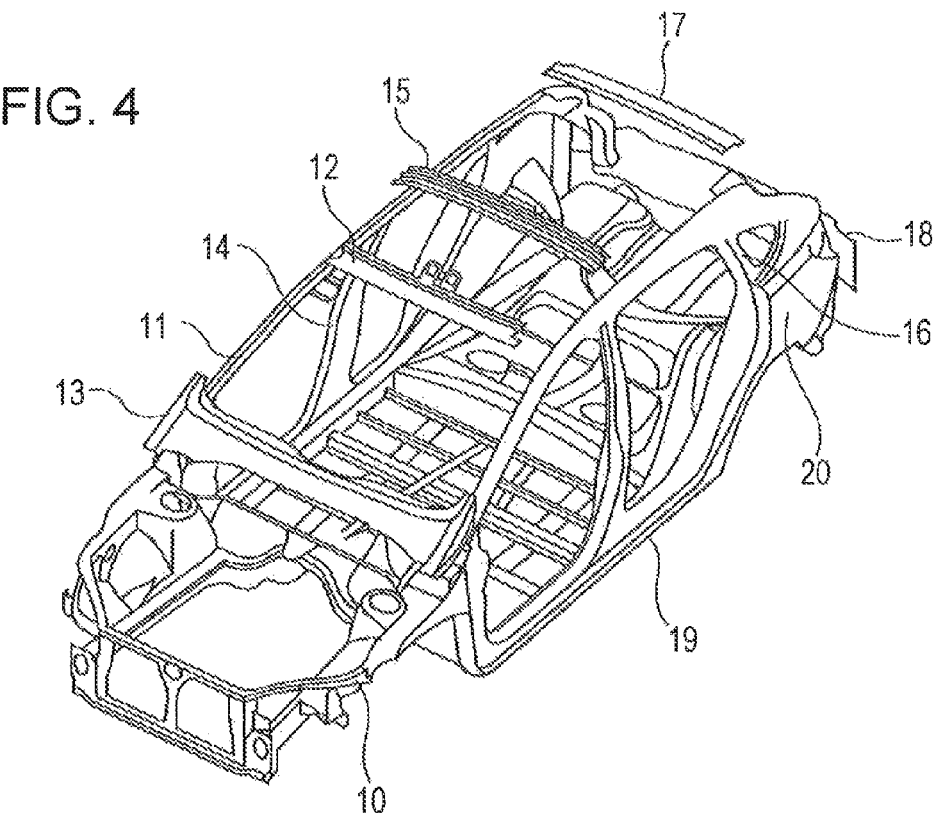
FIG. 4 is an explanatory diagram illustrating the manner in which annular parts along the width of the cabin are mounted in a second assembly process according to the implementation of the present invention.

In the second stage ST1 subsequent to the above-described first stage ST0, a first assembly process and a second assembly process are performed. In the first assembly process, side structures 20 as right and left side structural parts and the center structure 10 are positioned in place using a fixture 51 or the like, and each of the side structures 20 is fixed by welding to the center structure 10 with maintained accuracy of mounting positions. In the second assembly process, the annular parts along the width of the cabin of the vehicle, the rear skirt 18, the rear panel, and other parts are taken out, temporarily mounted to be retained without being welded on the vehicle body which has been assembled in the first assembly process, the annular parts along the width of the cabin of the vehicle being transported by the conveyor or the like and including the front rail 12, the duct complex 13, the brace center 15, the rear rail 17. More specifically, each side structure 20 includes, for example, a corresponding one of the front pillars 11, the center pillars 14, the rear quarters 16, and a side sill 19. That is, in the above-described first assembly process, as illustrated by shaded part of FIG. 3B, the front end, substantially the center, the rear end of the side sill 19 of the side structure 20, and the lower rear end part of the side structure 20 are fixed by welding to the center structure 10 with maintained accuracy of mounting positions (FIG. 3A illustrates the vehicle body after the fixation). As illustrated in the explanatory diagram of the second assembly process of FIG. 4, the front rail 12, the duct complex 13, the brace center 15, the rear rail 17, the rear skirt 18, the rear panel, and other parts are temporarily mounted to be retained without being welded the vehicle body in which the center structure 10 and the side structure 20 are fixed to each other.

Figure 5:
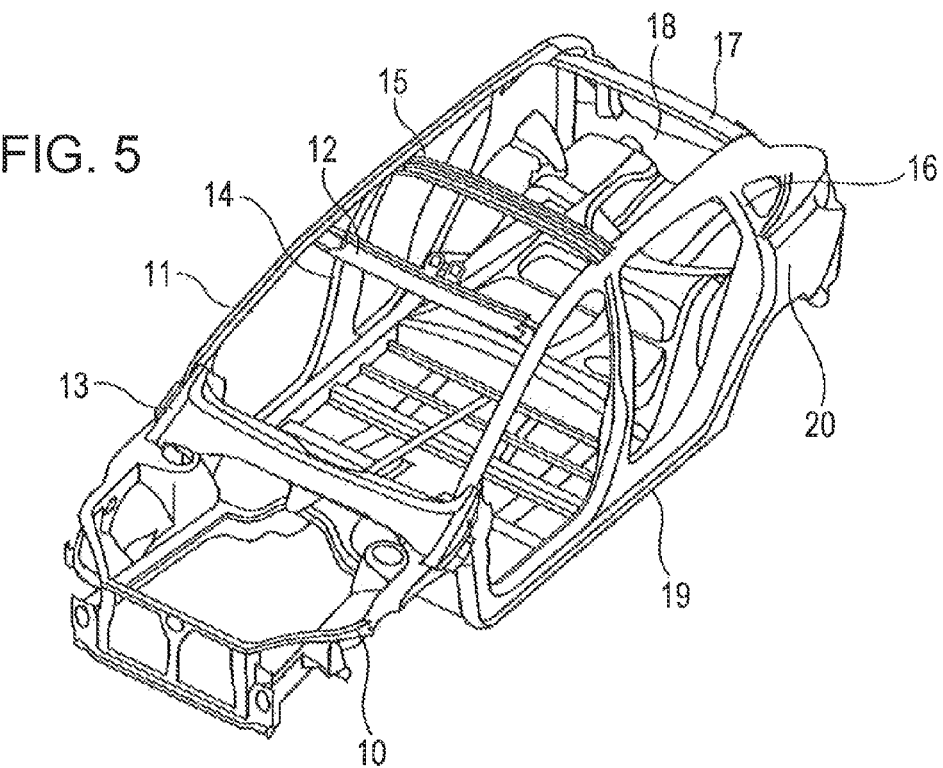
FIG. 5 is an explanatory diagram illustrating the manner in which annular parts along the width of the cabin are mounted in a third assembly process according to the implementation of the present invention.

In the third stage ST2 subsequent to the above-described second stage ST1, a third assembly process is performed (see FIG. 5) in which additional welding is performed on the side structure 20 and the center structure 10 of the vehicle body so as to reinforce the strength of the vehicle body which has been assembled in the first assembly process of the second stage ST1, and the parts mounted in the second assembly process of the second stage ST1 are positioned in place using a fixture or the like, and fixed by welding with maintained accuracy of mounting positions, the parts including the front rail 12, the duct complex 13, the brace center 15, the rear rail 17, the rear skirt 18, the rear panel, and other parts.

In the fourth stage ST3 subsequent to the above-described third stage ST2, a fourth assembly process is performed in which additional welding is performed on the parts of the vehicle body so as to reinforce the strength of the vehicle body which has been assembled in the above-described third stage ST2.

Figure 6:
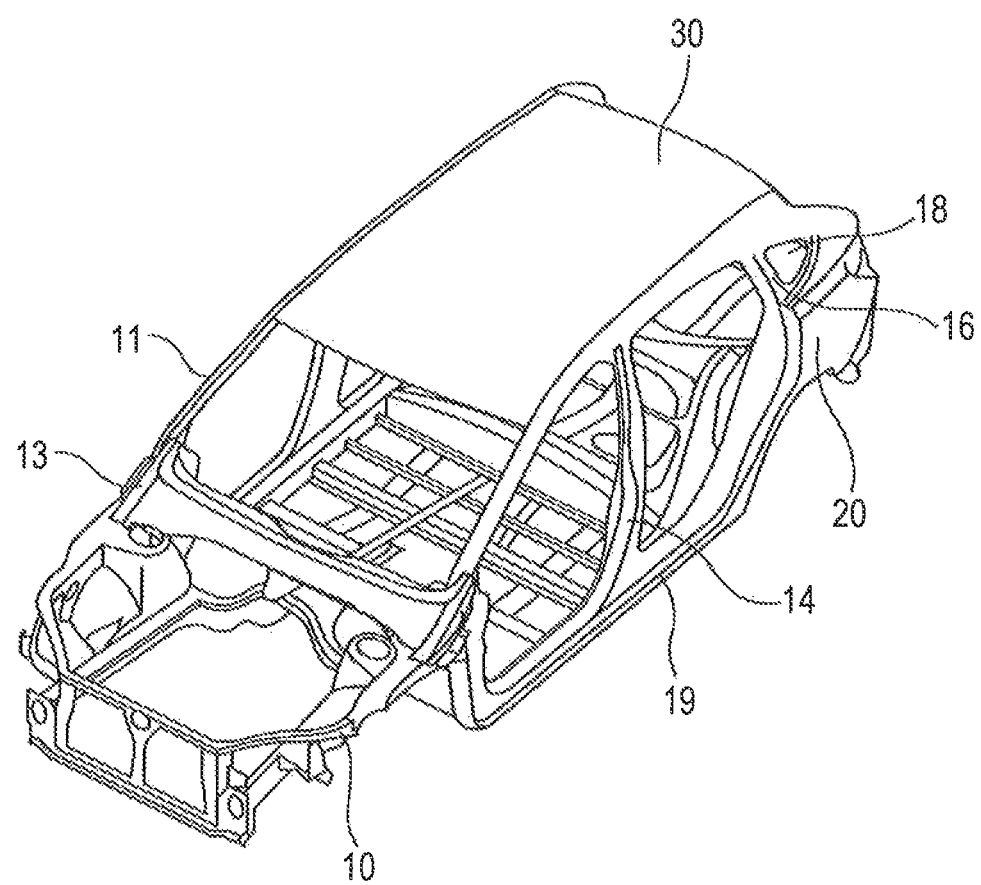
FIG. 6 is an explanatory diagram illustrating the manner in which a roof structural part is fixed in a fifth assembly process according to the implementation of the present invention.

In the fifth stage ST4 subsequent to the above-described fourth stage ST3, a fifth assembly process is performed (see FIG. 6) in which a roof structural part (roof complex) 30 is mounted by a robot 52, and fixed by welding with a welding robot to the vehicle body which has been assembled in the above-described fourth stage ST3 with maintained accuracy of mounting positions which is achieved by using a fixture or the like.

In the sixth stage ST5 subsequent to the above-described fifth stage ST4, the vehicle body, which has been assembled in the above-described fifth stage ST4, is carried out from the assembly line 1.

Hereinafter, a series of vehicle body assembly processes in the above-described assembly line 1 will be described with reference to the flow chart of FIG. 2. First, in step (hereinafter abbreviated as "S") 101, parts feeding process is performed in which the parts necessary for assembly of the vehicle body are supplied to the assembly line in the first stage ST0. The parts necessary for assembly of the vehicle body refers to the center structure 10, the front rail 12, the duct complex 13, the brace center 15, the rear rail 17, the rear skirt 18, the rear panel, and other parts.

Subsequently, the flow proceeds to S102, and in the second stage ST1, the first assembly process is performed in which the side structure 20 and the center structure 10 are positioned in place using the fixture 51 or the like, and the side structure 20 is fixed by welding to the center structure 10 with maintained accuracy of mounting positions.

Subsequently, the flow proceeds to S103, and in the second stage ST1, the second assembly process is performed in which the annular parts along the width of the cabin of the vehicle, the rear skirt 18, the rear panel, and other parts are temporarily mounted to be retained without being welded on the vehicle body which has been assembled in the first assembly process, the annular parts along the width of the cabin of the vehicle including the front rail 12, the duct complex 13, the brace center 15, the rear rail 17.

Subsequently, the flow proceeds to S104, and in the third stage ST2, the third assembly process is performed in which additional welding is performed on the side structure 20 and the center structure 10 of the vehicle body so as to reinforce the strength of the vehicle body which has been assembled in the first assembly process of S102, and the parts mounted in the second assembly process of S103 are positioned in place using a fixture or the like, and fixed by welding with maintained accuracy of mounting positions, the parts including the front rail 12, the duct complex 13, the brace center 15, the rear rail 17, the rear skirt 18, the rear panel, and other parts.

Subsequently, the flow proceeds to S105, and in the fourth stage ST3, the fourth assembly process is performed in which additional welding is performed on the parts of the vehicle body so as to reinforce the strength of the vehicle body which has been assembled in the third assembly process of S104.

Subsequently, the flow proceeds to S106, and in the fifth stage ST4, the fifth assembly process is performed in which the roof complex 30 is mounted by the robot 52, and fixed by welding with a welding robot to the vehicle body which has been assembled in the fourth assembly process of S105 with maintained accuracy of mounting positions which is achieved by using a fixture or the like.

The flow then proceeds to S107, and in the sixth stage ST5, a carrying out process is performed in which the vehicle body, which has been assembled in the above-described processes, is carried out.

In this manner, according to the implementation of the invention, first, the first assembly process is performed in which the side structure 20 and the center structure 10 are positioned in place using the fixture 51 or the like, and the side structure 20 is fixed by welding to the center structure 10 with maintained accuracy of mounting positions, and subsequently, the second assembly process is performed in which the annular parts along the width of the cabin of the vehicle and other parts are temporarily mounted to be retained without being welded on the vehicle body. Subsequently, the third assembly process is performed in which additional welding is performed on the side structure 20 and the center structure 10 of the vehicle body so as to reinforce the strength of the vehicle body which has been assembled in the first assembly process, and the annular parts along the width of the cabin of the vehicle and other parts mounted in the second assembly process are positioned in place using a fixture or the like, and are fixed by welding with maintained accuracy of mounting positions. Subsequently, the fourth assembly process is performed in which additional welding is performed on the parts of the vehicle body so as to reinforce the strength of the vehicle body which has been assembled in the third assembly process. Subsequently, the fifth assembly process is performed in which the roof complex 30 is mounted on the vehicle body which has been assembled in the fourth assembly process, and is fixed by welding to the vehicle body with maintained accuracy of mounting positions. In this manner, in the first assembly process, the side structure 20 is fixed to the center structure 10 with high accuracy at the beginning of the assembly, and thus many subsequent parts to be mounted on the vehicle body in which the side structure 20 is mounted on the center structure 10 can be mounted with the maintained mounting accuracy which is achieved easily and favorably. Consequently, an efficient assembly can be achieved without making a major adjustment until the mounting of the roof complex 30 is finally completed. In addition, because the fixation of the side structure 20 to the center structure 10 is first performed separately, it is possible to separately arrange welding robots, widely assure the operational range of the welding robots, and increase flexibility of arm movement to a welding position, the welding robots for fixing the side structure 20 to the center structure 10 and for fixing other parts to the vehicle body in which the side structure 20 is mounted on the center structure 10. This allows precise welding to be achieved, thereby making it possible to assemble a vehicle framework which sufficiently satisfies the strength (for example, the strength against a small overlap collision) and safety demanded. In addition, the annular parts along the width of the cabin of the vehicle can be successively mounted with high accuracy on the vehicle body in which the side structure 20 is mounted on the center structure 10, and thus sufficient strength and safety can be stably obtained reasonably. Also, it is not necessary to arrange a plurality of robots densely at positions on a narrow line, and thus a large mount is unnecessary and equipment can be simplified, thereby achieving reduction in equipment cost and improvement of visibility (safety) of production line. Furthermore, the side structure 20 is fixed to the center structure 10 with high accuracy and subsequent parts can be freely mounted, and thus it is easy to cope with design change in vehicle type and structure.

In the present implementation, the fifth assembly process is performed after the fourth assembly process in the present implementation. Alternatively, the fifth assembly process may be performed after the third assembly process and before the fourth assembly process as long as a sufficient operational range of the welding robots can be assured, where in the fifth assembly process, the roof complex 30 is mounted by the robot 52, fixed by welding with a welding robot to the vehicle body with maintained accuracy of mounting positions which is achieved by using a fixture or the like.

The invention claimed is:

1. A method of manufacturing a vehicle body of a vehicle, the method comprising:
   a feeding process to supply necessary parts for assembly of the vehicle body to an assembly line comprising a first stage, a second stage to which the vehicle body assembled at the first stage is transported from the first stage, and a carry-out stage from which the vehicle body assembled through foregoing stages including the first stage and second stage is carried out, the second stage being provided nearer to the carry-out stage than the first stage in a transporting direction of the vehicle body;
   a first assembly process, at the first stage, to fix by welding right and left side structural parts to a lower central structural part of the vehicle body with maintained accuracy of mounting positions, the right side structural part including a right front pillar, the left side structural part including a left front pillar;
   a second assembly process, at the first stage, to temporarily mount by retaining but not welding to the vehicle body which has been assembled in the first assembly process at least a part extending along a width of a cabin of the vehicle body, the part extending along a width of a cabin of the vehicle body including a front rail connecting the right front pillar and the left front pillar;
   a third assembly process, at the second stage, to perform additional welding on the lower central structural part and the right and left side structural parts of the vehicle body which has been assembled in the second assembly process, and to weld the part extending along the width of the cabin of the vehicle body to the vehicle body which has been assembled in the second assembly process, with maintained accuracy of mounting positions;
   a fourth assembly process to perform additional welding on one or more parts;
   a fifth assembly process to fix by welding at least a roof structural part with maintained accuracy of mounting positions after either one of the third assembly process and the fourth assembly process; and
   a carrying out process, at the carry-out stage, to carry out the vehicle body which has been assembled in the foregoing assembly processes,
   wherein, while the part extending along the width of the cabin of the vehicle body is retained by the temporary mounting without a welding, the vehicle body assembled in the second assembly process is transported from the first stage the second stage.

2. The method of manufacturing of a vehicle body according to claim 1,
   wherein the part extending along the width of the cabin of the vehicle body further includes a duct complex, a brace center that connects upper ends of right and left center pillars, and a rear rail that connects upper ends of right and left rear quarters.

3. A vehicle body manufactured in accord with the method of claim 1.

4. A vehicle body manufactured in accord with the method of claim 2.

5. A method of manufacturing a vehicle body, comprising:
   at a first stage of an assembly line, forming a vehicle body assembly by welding right and left side structural parts to a lower central structural part to join the right and left side structural parts to the lower central structural part in fixed positions, the assembly line comprising the first stage, a second stage to which the vehicle body assembly assembled at the first stage is transported from the first stage, and a carry-out stage from which the vehicle body assembly assembled in foregoing stages including the first stage and second stage is carried out, the second stage being provided nearer to the carry-out stage than the first stage in a transporting direction of the vehicle body assembly, the right side structural part including a right front pillar and the left side structural part including a left front pillar;

also at the first stage, mounting, without welding, at least a front rail connecting the right front pillar and the left front pillar to the vehicle body assembly to temporarily retain the front rail at a mounting position on the vehicle body assembly;

at the second stage, further welding the right and left side structural parts to the lower central structural part to reinforce the joining of the right and left side structural parts to the lower central structural part in the fixed positions, and performing a first welding of the front rail to the vehicle body assembly to join the front rail to the vehicle body assembly in fixed position; and welding a roof structural part to the vehicle body assembly to join the roof structural part to the vehicle body assembly in fixed position, wherein, while the front rail is temporarily retained without a welding, the vehicle body assembly assembled at the first stage is transported from the first stage to the second stage.

6. The method of manufacturing a vehicle body according to claim 5, wherein at the first stage, in addition to the front rail, there is also mounted, without any welding, to temporarily retain, a duct complex, a brace center that connects upper ends of right and left center pillars, and a rear rail that connects upper ends of right and left rear quarters.

7. A vehicle body manufactured in accord with the method of claim 5.

8. A vehicle body manufactured in accord with the method of claim 6.

9. The method of manufacturing a vehicle body according to claim 6, wherein while each of the front rail, the duct complex, the brace center, and the rear rail are temporarily retained without any welding, the vehicle body assembly assembled at the first stage is transported from the first stage to the second stage; and at the second stage, in addition to the front rail, a first welding is made to each of the duct complex, the brace center, and the rear rail to join each to the vehicle body assembly in fixed positions.

* * * * *